Dec. 18, 1951     F. KOENIG     2,579,386
GAP GAUGE
Filed Feb. 4, 1947
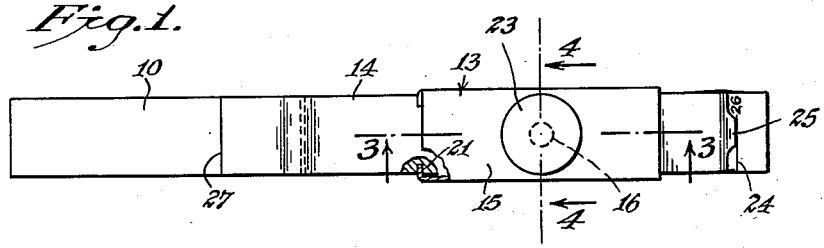
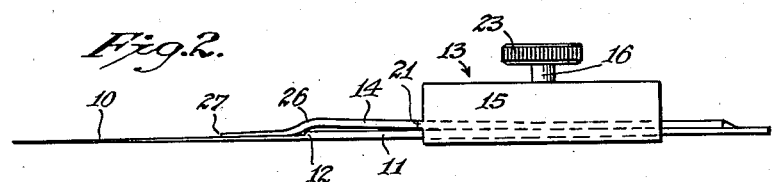
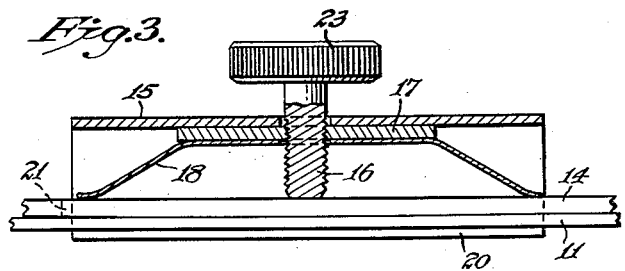
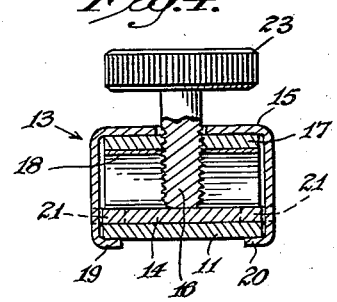
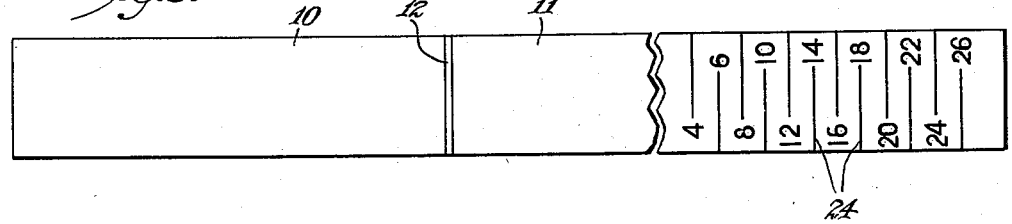
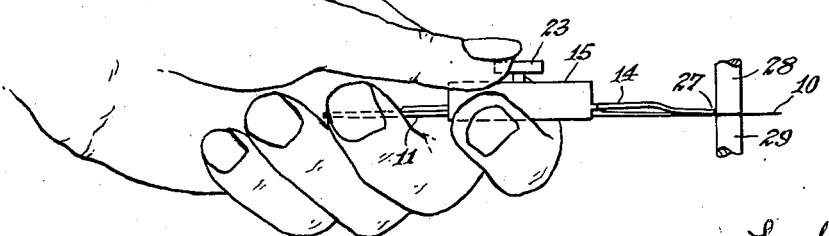
INVENTOR.
Fred Koenig Patented Dec. 18, 1951

2,579,386

UNITED STATES PATENT OFFICE 2,579,386

GAP GAUGE

Fred Koenig, Tottenville, N. Y.

Application February 4, 1947, Serial No. 726,400

7 Claims. (Cl. 33—168)

This invention relates to a gap micrometer and has for an object to provide such a tool which is accurate yet easy to read and easy to manipulate.

Another object is to provide a gradually tapered measuring strip to which an indicating strip is slidably attached for indicating the thickness of the measuring strip at the gap being measured.

Referring to the drawing,

Fig. 1 is a top plan view of a preferred embodiment of this invention.

Fig. 2 is a side elevation of the device of Fig. 1,

Fig. 3 is a section on the line 3—3 of Fig. 1,

Fig. 4 is a section on the line 4—4 of Fig. 1, the same being a transverse section through the housing showing the clamping screw, Fig. 5 is a top plan view of the measuring strip having graduations at its right or rear end portion, Fig. 6 shows the device of this invention in use as it is held in an operator's hand with the measuring strip inserted between the valve tappet and valve rod of a combustion engine to measure their separation or clearance.

The left end portion of the measuring strip shown in Figs. 1, 2 and 5 is gradually tapered at 10, the main or right-hand portion 11 of the strip being of substantially uniform thickness. Between the thicker main portion 11 and the measuring or tapered part 10 is an abutment wall 12 constituting a stop for the indicating strip or cover plate 14. A slide 13 movable relatively to the measuring strip comprises a housing 15 constituting a guide and support for the strips 10 and 14 with a clamping screw 16, the housing being longitudinally fixed to the indicating strip 14. Within the housing 15 in threaded engagement with the screw 16 is a thrust plate 17 between the top of the housing and a leaf spring 18. The spring 18 functions to frictionally press the strips 11 and 14 together against the bottom of the housing constituted by the in-turned flanges 19 and 20. Lugs 21 are formed from the sides of the housing and project laterally inwardly as shown in Figs. 1 to 4 for reception in recesses in the side edges of the indicating strip 14 in order that longitudinal movement of the housing may impart a like movement to the indicator strip. The head 23 of the screw 16 is peripherally knurled or otherwise roughened to make the screw conveniently adjustable by hand. The graduations 24 on the rear or right end of the measuring strip indicate the thickness of the tapered portion 10 when the indicating strip 14 is moved toward that portion of the strip 10, that is, when the strip 14 is moved so that its forward end is contiguous the valve or tappet rods shown in Fig. 6.

The rear end 25 of the indicator strip is shaped as shown in Fig. 1 to constitute a pointer for that graduation of the lower strip which is to be read. The forward portion of the strip 14 is bent at 26 as shown in Fig. 2 so that the bend cooperates with the wall 12 to constitute a stop whereby the strip 14 will not be moved too far back or off the measuring strip. The forward end of the indicating strip is the one which is brought up to contact the work whose gap is being measured. While the tool described is adapted for measuring gaps in any type of work, in Fig. 6 it is shown in use for measuring the clearance between the valve rod 28 and the valve tappet 29 of an internal combustion engine.

In operation the measuring strip 10 is inserted in the gap whose size is to be measured. The indicating strip 14 is withdrawn its maximum amount to the rear, that is, with the bent portion contacting the abutment 12. When the measuring strip 10 has been inserted in the gap as far as it will go, i. e., until it fills the gap, then the indicating strip 14 is moved forward until its forward edge 27 contacts the near or forward side of the work containing the gap as shown in Fig. 6. The measuring strip may then be withdrawn from the gap while the indicating strip is retained in its position for indicating the thickness of the gap as shown in Fig. 6. To clamp the two strips 10 and 14 together such may be done either by pressure of the thumb upon the screw head 23 or by clamping the screw against the two strips. Fig. 3 illustrates the arrangement of parts when the screw 16 is turned to hold the measuring and indicating strips clamped together. If the screw is loosened or raised from the position shown in Fig. 3 so that the screw 16 clears the indicating strip a small amount, it will be possible to still clamp the strips together by thumb pressure on the screw head 23. This downward thrust is transmitted through the thrust plate 17 to the spring 18 for exerting greater pressure on the strips and also by application of pressure on the screw 16 so that the spring 18 is spread enough to allow the lower or inner end of the screw 16 to contact and press the two strips together by manual pressure rather than screw pressure. After withdrawing the strips in their correct position with respect to one another the thickness of the gap may be read by reading the index 25 on the rear end of the indicator strip and noting which one of the graduations 24 is nearest it. The position of the index 25 with respect to the graduations will indicate the thickness of the measuring strip 10 at the forward end 27 of the indicator strip. After the reading has been taken the indicator strip may be released from its position in which it is held or clamped against the measuring strip and the indicator strip 14 moved to the right or rear position shown in Fig. 2 for again repeating the measuring operation elsewhere. Where at least a given clearance or gap width is desired the indicator strip may be set to a given amount using the index 25 on the graduations 24 and the two strips clamped in their desired position by tightening the screw head 23 until the strips are firmly clamped together. In the embodiment illustrated the graduations 24 designate the thousandths of inches that the measuring strip 10 is in thickness at corresponding locations spaced from the front or small end of the strip for a distance equal to the length of the indicating strip 14. Of course other thicknesses and other units of measurement may be applied for the graduations 24 and the taper and thickness of the measuring strip 10.

While the term "gradually tapered" implies the simplest and least expensive construction for the measuring strip 10 it is desired to have the term construed broadly enough to include a series of narrow steps of uniform thickness, each step differing from its preceding step by a desired amount indicated in the value of the graduations. The screw 16 constitutes a projection on the housing 15, which projection is engageable by an operator's thumb for moving the indicator strip 14 to which the housing is keyed by lugs 21. The screw 16 is also adapted to clamp the strips 10 and 14 by thumb pressure upon flexing spring 18.

Among the advantages of this invention may be mentioned the provision of a simple inexpensive tool adapted for accurate measurement of the width of a gap. The tool is particularly applicable for measurement of gaps in work in which the sides of the gap are either true flat surfaces or else are formed between walls rounded with a small radius of curvature so that in either case when the forward end of the indicating strip 14 is moved contiguous the work it is substantially contiguous the gap to be measured. Maintaining the indicating and measuring strips clamped together either by manual pressure or by the screw clamp adapts the tool for operations where quick reading and shifting of the strips is desired as well as for locations in which little relative movement between the strips is expected in which latter event the strips may be clamped together by screw pressure. Of course in reading the graduations 24 where the index is not precisely on one of the graduations, a correct reading is obtained by interpolation, familiar to those skilled in the art. It will be noted that the measuring strip 10 may be withdrawn from its slightly wedged position in the gap without danger of accidental movement with respect to the indicating strip 14, by simply applying thumb pressure to the screw head 23 as described.

What is claimed is:

1. A gap micrometer comprising a strip having a gradually tapered part for insertion into said gap, and provided thereon with graduations indicating corresponding variations in the thickness of said tapered part, an indicator for reading said graduations and slidable along said strip to one side of the gap being measured, and clamping means for the indicator and strip, said means including a housing secured to and slidable with said indicator along said strip, and a clamp screw passing through the housing for clamping said strip and indicator against a side of said housing opposite that through which the clamp screw extends.

2. A gap micrometer comprising a tapered measuring strip, and another strip slidable along said measuring strip for indicating the thickness of said measuring strip adjacent the end of said second strip, a stop for limiting movement of said indicator strip in one direction, a housing secured to said indicator strip for longitudinal movement therewith, a leaf spring within said housing pressing said strips together and against one side of said housing, a thrust plate between said spring and housing, and a thumb screw in threaded engagement with said plate having an enlarged head outside the housing adapted to clamp said strips to the housing by direct pressure on said screw head or by rotation thereof.

3. A gap micrometer comprising a strip having a gradually tapered part for insertion into said gap, and provided thereon with graduations indicating corresponding variations in the thickness of said tapered part, an indicator for reading said graduations and slidable along said strip to one side of the gap being measured, and clamping means for the indicator and strip, said means including a housing secured to and slidable with said indicator along said strip, and a clamp screw passing through the housing for clamping said strip and indicator against a side of said housing opposite that through which the clamp screw extends, said clamping means including a leaf spring within said housing, cooperating with said indicator and strip on each side of said screw, a thrust plate between said spring and housing with which the screw is in threaded engagement, said housing having longitudinally extending inturned flanges against which said strip is pressed by said spring, said housing also having transversely in-turned lugs engaging recesses in said indicator for connecting said housing to said indicator.

4. In a gap micrometer of the type having a gradually tapered strip for insertion into a gap, an indicator strip slidably secured to said tapered strip, graduations on one of said strips along which the other strip is slidable, the combination therewith of the improvement for holding said strips in one adjusted position against accidental relative movement, said improvement including a housing secured to said other strip, said housing extending transversely around said strips and being slidable with respect to the strip on which the graduations are placed, and clamping means for holding said housing and strips in one position of adjustment.

5. A gap micrometer comprising a gradually tapered strip for insertion in gaps of different sizes, an indicator strip slidable longitudinally with respect to said tapered strip for cooperation with graduations thereon, a housing in addition to said strips fixed with respect to one of the strips and movable longitudinally therewith as a guide and support for said strips, and a thumb screw projecting from said housing for clamping said strips together against a side of the housing.

6. A gap micrometer according to claim 5 in which a thrust plate is threaded on said screw within said guide and support housing, and a spring cooperates with said strips and thrust plate, the guide and support housing being free of threaded cooperation with said thumb screw where said screw passes through the same.

7. A gap micrometer comprising a gradually tapered strip for insertion in gaps of different sizes, an indicator strip slidable longitudinally with respect to said tapered strip for cooperation with graduations thereon, a housing in addition to said strips fixed with respect to one of the strips and movable longitudinally therewith as a guide and support for said strips, and a thumb engaging projection resiliently mounted within said housing to project therefrom and to move with the indicator strip for clamping it against said tapered strip.

FRED KOENIG.

REFERENCES CITED

The following references are of record in the file of this patent:

UNITED STATES PATENTS

| Number | Name | Date |
| --- | --- | --- |
| 987,703 | Curtin | Mar. 28, 1911 |
| 1,191,596 | Hindman | July 18, 1916 |
| 1,194,749 | Kirk | Aug. 15, 1916 |
| 1,779,812 | Hastings | Oct. 28, 1930 |
| 2,197,668 | Starr | Apr. 16, 1940 |
| 2,200,453 | Lizakowski | May 14, 1940 |